United States Patent [19]

Hayama et al.

[11] Patent Number: 4,741,969

[45] Date of Patent: May 3, 1988

[54] AQUEOUS INK RECORDING SHEET

[75] Inventors: Kazuhide Hayama; Akira Yamashita, both of Mie, Japan

[73] Assignee: Mitsubishi Petrochemical Co., Ltd., Tokyo, Japan

[21] Appl. No.: 917,682

[22] Filed: Oct. 10, 1986

[30] Foreign Application Priority Data

Oct. 21, 1985 [JP] Japan ................................. 60-234874

[51] Int. Cl.$^4$ ...................... B32B 23/08; B32B 27/10; B05D 3/06
[52] U.S. Cl. .................................... 428/514; 428/511; 427/54.1; 522/112; 522/109; 522/149; 525/57
[58] Field of Search ................. 522/86, 106, 149, 112, 522/109; 427/54.1; 428/511, 514; 525/57

[56] References Cited

U.S. PATENT DOCUMENTS

| | | | |
|---|---|---|---|
| 3,530,100 | 9/1970 | D'Alelio | 522/106 |
| 3,737,319 | 6/1973 | Borden | 522/149 |
| 3,754,054 | 8/1973 | Kimura et al. | 522/149 |
| 3,773,547 | 11/1973 | Spoor et al. | 522/149 |
| 4,152,159 | 5/1979 | Daly et al. | 522/149 |
| 4,287,039 | 9/1981 | Buethe et al. | 522/86 |
| 4,446,174 | 5/1984 | Maekawa et al. | 427/261 |

FOREIGN PATENT DOCUMENTS

A143991 7/1985 Japan.

*Primary Examiner*—John H. Newsome
*Assistant Examiner*—M. L. Padgett
*Attorney, Agent, or Firm*—Oblon, Fisher, Spivak, McClelland & Maier

[57] ABSTRACT

An aqueous ink recording sheet is described which is prepared by coating on the surface of a substrate sheet a resin composition containing as the chief ingredient a mixture comprising (A) 10 to 90 wt % of photo polymerizable, double bonded anionic synthetic resin, and (B) 90 to 0 wt % of partially or completely saponified polyvinyl alcohol, or partially or completely saponified polymer resin composed of 20 to 100 wt % of vinyl acetate and 80 to 0 wt % of other polymerizable monomer or derivatives thereof, and/or (C) 90 to 0 wt %.of homopolymer resin of N-vinylpyrrolidone or copolymer resin of other polymerizable monomer therewith, with the weight ratio of (A)/[(B)+(C)] being 90/10 to 10/90, drying the coated resin composition, and then curing the resin composition by the irradiation with actinic rays so as to form a resin coating layer on the substrate.

The aqueous ink recording sheet of the present invention is not only capable of recording distinctly and sharply the multicolor full color copy that is an advantageous point in ink jet process but also excellent in both the adsorbency and the dryness against the ink.

17 Claims, No Drawings

AQUEOUS INK RECORDING SHEET

FIELD OF THE INVENTION

This invention relates to a recording sheet used with aqueous ink, and particularly an ink jet recording sheet wherein as the substrate are used paper, plastic film, synthetic paper, metal sheet, etc., which can provide color image of high image quality by an ink jet recording system.

BACKGROUND OF THE INVENTION

Since an ink jet recording system produces no noise, requires neither developing nor fixing process, and can make not only high speed recording but also multicolor recording very easily, it is rapidly coming in wide use in facsimile, word processor, terminal printer, etc., in recent years. Above all, the development of the color printer based on the ink jet recording system which prepares color hard copy from color display is being progressed. As the ink jet color printer there have been developed color printers of high resolution which can be used not only in the field of color graphics using seven representing colors (yellow, magenta, cyan, red, green, purple, black) but also recently in the so-called pictorial color copy, that is, full color copy which can provide images of high image quality close to gravure printing or silver salt photograph.

The ink jet recording is advantageous in that ordinary plain paper, the so-called plain paper copies (PPC) can be used. However, it is the real situation that in general the ordinary plain paper cannot satisfy the requirement as the ink jet recording paper adapted for multicolor recording.

The fundamental properties required for the ink jet recording sheet may be enumerated as follows.

1. The shape of the dot is circular without spreading in blots, and the periphery of the dot is sharp having high resolution.
2. The dot is high in color density and good in sharpness.
3. The absorption velocity of ink is fast, the dryness is excellent, the amount of the ink absorbed is large, and moreover, when the dots of ink overlap each other, the dot later adhering does not run, and so on, thus proving to be well suited to multicolor recording property.
4. After recording, dimentional variation is small, and curling, waving, and deformation are not found, and so on.

Above all, it is now becoming a technical subject among those skilled in the art to make compatible the mutually contradictory properties, i.e., the absorptiveness against ink that governs the dryness of ink and the property of spreading (blot) of the dot.

Namely, when the absorptiveness against ink of the recording paper is fast, the spreading of the dot is enlarged and the shape of the dot is also distorted, so that the resolution is aggravated. Furthermore, the ink has a tendency to penetrate into the paper layers so deeply that both the color density and the sharpness are lowered.

Besides the above, where high image quality is to be obtained by the recent multicolor recording, the inks of the respective colors adhere to the same place or its neighborhood on the recording sheet in a short period of time, so that particularly a large absorptive capacity against these inks is requested along with the absorptiveness against these inks. Otherwise, the unabsorbed inks may run out (flow), and as the result no sharp image may be obtained as well as stain may be caused to generate.

As the ink jet recording paper the ordinary plain paper such as fine paper can be basically used, but it is the real situation that those skilled in the art of manufacturing the recording paper adapt various paper properties such as the degree of sizing, air permeability, density, smoothness, and dimensional stability such as elongation in water, etc., to the recording system, or the conditions or the ink thereof. On the other hand, in order to obtain the color recording of high image quality that is the recent tendency, even by controlling all the above described physical properties it is not possible to achieve the object in doing so alone. Therefore, in order to acquire the recording characteristics satisfying the above described fundamental requirement it is now under investigation to obtain an ink jet recording paper of coated paper type in which the pigment, binder, etc., have been made optimum by providing a coated layer on the surface of the sheet. Nevertheless, in actuality that is found as yet no ink jet recording paper for high image quality use, which can satisfy, not to mention the recording performance, every point of the water resistance, weather resistance, dimensional stability, etc., of the recording part. Recently, there is a tendency that it is requested to use as the substrate sheet not only paper but also either water-proof sheet or transparent sheet such as impregnated paper, plastic film, synthetic paper, metal sheet, etc. For instance, concretely as the color display introduction into a personal computor progresses there is requested transparent film which is capable of ink jet recording for use of color hard copy in overhead projector (OHP). However, the plastic film such as polyester, or the like, used in OHP cannot be used since it is entirely lacking the absorbency to aqueous ink due to the hydrophobicity differing from paper substrate material. The other processed papers such as impregnated paper, etc., synthetic paper, metal sheet, etc., are also the same as above.

In the development of the ink jet recording sheet using as the substrate material such a novel raw material it was found that so far as we are at grips with this problem based on the conventional concept concerning the manufacture of ordinary plain paper or coated paper there should be a technical limitation.

Still further, as the solvent of an ink used in ink jet process water cannot be used alone because the jetting nozzle is clogged by the evaporation of the water, so that, in order to avoid such clogging due to drying there are various devices such that polyalkyleneglycol or other wetting agents are added to water. However, when recording on the recording sheet made of synthetic resin film, or the like, by the use of such an ink and solvent, this reversely results in aggravation of the dryness of the ink.

As above described how distinctly and sharply the ink dots by ink jetting can be made to adhere and moreover how rapidly they can be made to be absorbed and dried on the recording sheet particularly on the transparent synthetic resin film such as polyester, etc., are the most important problems in the field concerned.

SUMMARY OF THE INVENTION

Therefore, an object of this invention is to provide an aqueous ink recording sheet which is not only capable of recording distinctly and sharply the multicolor full color copy that is an advantageous point in ink jet process but also excellent in both the absorbency and the dryness against the ink.

The above-described object of the present invention is attained with an aqueous ink recording sheet which is prepared in such a manner that a resin composition containing as the chief ingredient a mixture comprising (A) 10 to 90 wt% of photopolymerizable, double bonded anionic synthetic resin, and (B) 90 to 0 wt% of partially or completely saponified polyvinyl alcohol, or partially or completely saponified polymer resin composed of 20 to 100 wt% of vinyl acetate and 80 to 0 wt% of other polymerizable monomer, or derivatives thereof and/or (C) 90 to 0 wt% of homopolymer resin of N-vinylpyrrolidone or copolymer resin of other polymerizable monomer therewith is coated on the surface of a support sheet, with the weight ratio of (A)/[(B)+(C)] being 90/10 to 10/90, the coated resin composition is dried and then by the irradiation with actinic rays the dried resin composition is cured to provide a resin coating layer on the substrate.

DETAILED DESCRIPTION OF THE INVENTION

This invention contemplates to provide clear printing without spreading of ink by improving the adhesion of an aqueous ink in such a manner that a resin composition containing as the chief ingredient a mixture comprising (A) 10 to 90 wt% of a specific anionic resin of the type curable by actinic rays, and (B) 90 to 0 wt% of partially or completely saponified polyvinyl alcohol, or partially or completely saponified polymer resin composed of 20 to 100 wt% of vinyl acetate and 80 to 0 wt% of other polymerizable monomer, or derivatives thereof and/or (C) 90 to 0 wt% of homopolymer resin of N-vinylpyrrolidone or copolymer resin of other polymerizable monomer therewith with the weight ratio of (A)/[(B)+(C)] being 90/10 to 10/90 is coated on the surface of a support sheet, the coated resin composition is dried and then by the irradiation with actinic rays the dried resin composition is cured to provide a resin coating layer on the substrate.

That is to say, the recording sheet of this invention can show an excellent ink jet recording characteristics in that by virtue of the above-described resin coating layer the absorption and drying of the ink drops are satisfactory, neither spreading of the ink drops nor penetration of the ink deeply into the interior of said coating layer takes place, so that the sharpness of the ink drops can produce a clear image. Also, on account of the fact that the anionic synthetic resin contained in the resin composition has been converted into a three dimensional structure by the irradiation with actinic rays the water resistance is also satisfactory, and the recording sheet itself also shows no appreciable deformation even after the recording. Further, since the anionic synthetic resin is an electrolyte polymer, the recording sheet of this invention shows a good antistatic property characterized in that no dust or the like adhere to it.

(Anionic Polymerizable Resin)

The (A) photopolymerizable, double bonded anionic synthetic resin of this invention is a polymerizable resin which has a polymerizable double bond and an anionic group selected from the group consisting of carboxyl group, sulfonic acid group, sulfate group, and phosphate group, and/or the functional group of the neutral salt thereof, and as the illustrative the following (i) to (vi) may be mentioned.

(i) A resin which is obtained by allowing a polymer resin composed of 10 to 100 wt% of carboxyl group-containing polymerizable monomer and 90 to 0 wt% of hydrophobic polymerizable monomer further to react with epoxy group-containing polymerizable monomer so that 0.03 to 0.60 g equivalent of the carboxyl group-containing polymerizable monomer in the polymer resin may enter into the reaction and esterify portion of the carboxyl group in the polymer resin, and then neutralizing partially or completely the remaining carboxyl group with a base such as alkali, ammonia, or amine, etc.

The specific examples of the above-described carboxyl group-containing polymerizable monomer include monoacrylic acids such as acrylic acid, methacrylic acid, etc.; polybasic acids such as maleic acid, itaconic acid, citraconic acid, etc., or acid anhydrides thereof.

The specific examples of the hydrophobic monomer include alkyl acrylates and methacrylates such as methyl acrylate, methyl methacrylate, ethyl acrylate, ethyl methacrylate, propyl acrylate, propyl methacrylate, butyl acrylate, butyl methacrylate, hexyl acrylate, hexyl methacrylate, octyl acrylate, octyl methacrylate, lauryl acrylate, lauryl methacrylate, stearyl acrylate, stearyl methacrylate; benzyl acrylate, benzyl methacrylate, ethoxyethyl acrylate, ethoxyethyl methacrylate, hydroxyethyl acrylate, hydroxyethyl methacrylate, hydroxypropyl acrylate, hydroxypropyl methacrylate, styrene, vinyltoluene, vinyl acetate, etc.

And the specific examples of the epoxy group-containing polymerizable monomer include the compounds containing vinyl group and epoxy group such as glycidyl acrylate, glycidyl methacrylate, allyl glycidyl ether, styryl glycidyl ether, glycidyl cinnamate, etc.

The specific examples of the base neutralizing carboxyl group include alkali hydroxides such as lithium hydroxide, sodium hydroxide, potassium hydroxide; ammonia; primary amines such as ethylamine; secondary amines such as diethylamine; tertiary amines such as trimethylamine, triethanolamine; etc.

Preferred examples of the resins of (i) include resins containing both the following units in a molecular chain:

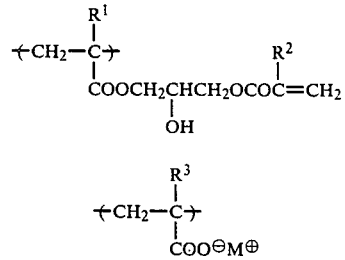

wherein $R^1$, $R^2$, and $R^3$ each represents H or $CH_3$, and M represents Li, Na, K, $NH_4$ or an amine residue such as $CH_3CH_2NH_3$, $(CH_3CH_2)_2NH_2$, $(CH_3)_3NH$, $(HOC_2H_4)_3NH$, etc.

(ii) A resin which is obtained by allowing a polymer resin composed of 10 to 100 wt% of carboxyl group-containing polymerizable monomer and 90 to 0 wt% of hydrophobic polymerizable monomer further to react with hydroxyl group-containing polymerizable monomer so that 0.03 to 0.60 g equivalent of the carboxyl group-containing polymerizable monomer in the polymer resin may enter into the reaction and esterify portion of the carboxyl group in the polymer resin, and then neutralizing partially or completely the remaining carboxyl group with a base such as alkali, ammonia, or amine, etc.

As for the carboxyl group-containing polymerizable monomer, hydrophobic polymerizable monomer and base, the same substances as in (i) can be used, and the specific examples of the hydroxyl group-containing polymerizable monomer include hydroxyethyl acrylate, hydroxyethyl methacrylate, hydroxypropyl acrylate, hydroxypropyl methacrylate, etc.

(iii) A resin which is obtained by allowing a polymer resin composed of 10 to 100 wt% of carboxyl group-containing polymerizable monomer and 90 to 0 wt% of hydrophobic polymerizable monomer further to react with halogenated polymerizable monomer so that 0.03 to 0.60 g equivalent of the carboxyl group-containing polymerizable monomer in the polymer resin may enter into dehydrohalogenation reaction and esterify portion of the carboxyl group in the polymer resin, and then neutralizing partially or completely the remaining carboxyl group with a base such as alkali, ammonia, or amine, etc.

As for the carboxyl group-containing polymerizable monomer, hydrophobic polymerizable monomer, and base, the same substances in (i) can be used, and the specific examples of the halogenated polymerizable monomer include haloalkyl acrylate, haloalkyl methacrylate, halomethylstyrene, allyl halide, etc.

Preferred examples of the resins of (ii) or (iii) include resins containing both the following units in a molecular chain:

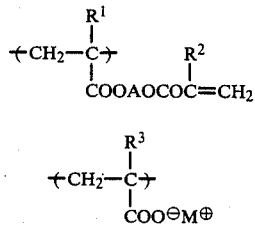

wherein $R^1$, $R^2$, and $R^3$ each represents H or $CH_3$, and M represents Li, Na, K, $NH_4$ or an amine residue such as $CH_3CH_2NH_3$, $(CH_3CH_2)_2NH_2$, $(CH_3)_3NH$, $(HOC_2H_4)_3NH$, etc., and A represents an alkylene group having 2 to 6 carbon atoms.

(iv) A resin which is obtained by allowing epoxy compound to react with unsaturated polybasic acid to give a resin having carboxyl group and polymerizable double bond, and then neutralizing partially or completely the carboxyl group of the resin with a base such as alkali, ammonia, or amine, etc.

The specific examples of the epoxy compound include diglycidyl ether of bisphenol A, diglycidyl ether of bisphenol F, novolak epoxy resin, cresol novolak epoxy resin, glycidyl acrylate or glycidyl methacrylate, resins obtainable by copolymerization of these compounds and other monomers copolymerizable therewith, etc. Preferred examples of the above-described other monomers copolymerizable with those compounds include methyl acrylate, methyl methacrylate, ethyl acrylate, ethyl methacrylate, butyl acrylate, butyl methacrylate, cyclohexyl acrylate, cyclohexyl methacrylate, lauryl acrylate, lauryl methacrylate, stearyl acrylate, stearyl methacrylate, styrene, vinyl toluene, vinyl chloride, etc.

The specific examples of the unsaturated polybasic acid include itaconic acid, maleic acid, and anhydrides thereof.

(v) A resin which is obtained by first allowing the polybasic acid group (including also acid anhydride group) of polybasic acid group (including also acid anhydride group)-containing resin to react with the hydroxyl group of hydroxyl group-containing polymerizable monomer to form a vinyl group- and carboxy group-containing resin and then neutralizing partially or completely the remaining carboxyl group in the resin with a base such as alkali, ammonia, or amine, etc.

As for the base, the same substances as in (i) can be used, and the specific examples of the polybasic acid group-containing resin include itaconic acid acrylic ester copolymer resin, maleic anhydride styrene copolymer resin, maleic anhydride grafted polyethylene, etc.

Also, the specific examples of the hydroxyl group-containing polymerizable monomer include the hydroxyl group-containing acrylate, hydroxyl group-containing methacrylate, etc., that were stated in (ii).

Preferred examples of the resins of (v) include resins containing the following units in a molecular chain:

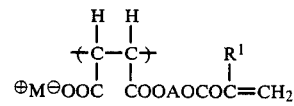

wherein $R^1$ represents H or $CH_3$, M represents Li, Na, K, $NH_4$ or an amino residue such as $CH_3CH_2NH_3$, $(CH_3CH_2)_2NH_2$, $(CH_3)_3NH$, $(HOC_2H_4)_3NH$, etc., and A represents an alkylene group having 2 to 6 carbon atoms.

(vi) A resin which is obtained by partially or completely replacing the carboxyl group-containing polymerizable monomer in the resins of (i) to (iii) by the polymerizable monomer containing sulfonic acid group, sulfate group or phosphate group such as styrenesulfonic acid, styrenesulfate, 2-hydroxyethylacryloyl phosphate, 2-hydroxyethylmethacryloyl phosphate, etc.

In these resins of (i), (ii), (iii) and (vi), in order to obtain the copolymer resin as the precursor, the carboxyl group-containing polymerizable monomer and-/or the polymerizable monomer containing sulfonic acid group, sulfate group, or phosphate group is used in an amount of 10 to 100 wt%, or preferably 20 to 80 wt%, and the hydrophobic polymerizable monomer is used in an amount of 90 to 0 wt%, or preferably 80 to 20 wt%. Also, against the polymer resin containing the carboxyl group and/or sulfonic acid group, sulfate group, or phosphate group, the polymerizable monomer containing epoxy group or hydroxyl group, or the halogenated polymerizable monomer is used in an amount of 0.03 to 0.60 g equivalent, or preferably 0.10 to 0.50 g equivalent of the polymerizable monomer containing carboxyl group and/or sulfonic acid group, sulfate group, or phosphate group.

Further, in the resin of (iv) the epoxy compound is used in an amount of 1 to 40 mols per mol of polybasic acid.

Still further, in the resin of (v) the polybasic acid (or acid anhydride thereof), and hydroxyl group-containing polymerizable monomer are used in the same amounts as the carboxyl group-containing polymerizable monomer, and hydroxyl group-containing acrylate or hydroxyl group-containing methacrylate, respectively, of the resin of (ii).

Where the amount of the hydrophobic polymerizable monomer or hydrophobic resin is smaller than the above described, the coating of the cross-linked resin layer obtained by light curing the polymerizable monomer proves to be insufficient in the water resistance, so that the aqueous ink spreads in blots and no sharp image can be obtained. On the contrary, where the amount is too large, the coating after the light curing is made hydrophobic, and the absorption and drying of the aqueous ink become poor.

Also, where the amount of the polymerizable monomer containing carboxyl group, sulfonic acid group, sulfate group, and phosphate group is too small, the absorption and drying of the aqueous ink become insufficient. On the contrary, where it is too large, the aqueous ink spreads in blots and no sharp image can be obtained.

The number average molecular weight of this (A) component, anionic resin of the type curable by actinic rays is 1,000 to 1,000,000 or preferably 5,000 to 100,000.

(Polyvinyl alcohol and/or polyvinylpyrrolidone)

Reference will now be made to the (B) component of this invention, i.e., partially or completely saponified polyvinyl alcohol, or partially or completely saponified polymer resin of vinyl acetate with other polymerizable monomer, or derivatives thereof, Preferred examples of the above-described other polymerizable monomers include ethylene, vinyl chloride, etc. In the partially or completely saponified polyvinyl alcohol, or partially or completely saponified polymer resin of vinyl acetate with other polymerizable monomer used in this invention, the degree of saponification is preferably 60 mol% or more, and more preferably 70 mol% or more. Where the degree of saponification is less than 60 mol%, the dryness of the ink is insufficient, showing poor compatibility with the anionic resin and when coating is formed whitening occurs. Also, the number average molecular weight of the partially or completely saponified polyvinyl alcohol, or partially or completely saponified polymer of vinyl acetate with other polymerizable monomer is preferably 5,000 to 150,000, or more preferably, from the aspect of layer strength and workability, 10,000 to 100,000. For such polyvinyl alcohol various kinds of commercial products are available. Preferred examples of the commercial polyvinyl alcohol include Gosenol which is trademark of polyvinyl alcohol manufactured by Nippon Synthetic Chemical Industry Co., Ltd., Poval which is trademark of polyvinyl alcohol manufactured by Kuraray Co., Ltd., etc. The specific examples of the derivative of partially or completely saponified polyvinyl alcohol, or partially or completely saponified polymer of vinylacetate with other polymerizable monomer include, for example, cinnamic ester derivative, anionized product thereof.

Next, reference will be made to the (C) component of this invention, i.e., the homopolymer of N-vinylpyrrolidone or copolymer resin of other polymerizable monomer therewith. Preferred examples of the above-described other monomers polymerizable with N-vinylpyrrolidone include vinyl acetate, methyl acrylate, methyl methacrylate, ethyl acrylate, ethyl methacrylate, butyl acrylate, butyl methacrylate, methyl acrylamide, methyl methacrylamide, vinyl chloride, etc. Preferred examples of the homopolymer of N-vinylpyrrolidone or copolymer resin of other polymerizable monomer therewith used in this invention include homopolymer of vinylpyrrolidone, copolymer of vinylpyrrolidone with vinyl acetate, etc., or the like, and their number average molecular weight is preferably 5,000 to 1,000,000, more preferably 10,000 to 800,000. For such polyvinylpyrrolidone-series resins various commercial products are available. Preferred examples of the commercial polyvinylpyrrolidone-series resins include Luviskol which is trademark of polyvinylpyrrolidone-series resin manufactured by Mitsubishi Yuka Badische Co., Ltd., etc.

As for the mixing ratio of (A) photo polymerizable, double bonded anionic synthetic resin, and (B) partially or completely saponified polyvinyl alcohol, or partially or completely saponified polymer of vinyl acetate with other polymerizable monomer, or derivatives thereof, and/or (C) homopolymer of N-vinylpyrrolidone or copolymer of other polymerizable monomer therewith, it is desirable that (A) is 10 to 90 wt%, (B( is 90 to 0 wt%, (C) is 90 to 0 wt%, and the weight ratio of (A)/[(B)+(C)] is 90/10 to 10/90, or preferably 80/20 to 20/80. Where the sum of (B) and (C) is less than 10 wt%, no improved dryness and sharpness of ink image is obtained in the recording, and on the contrary, where (B)+(C) is larger than 90 wt%, the water resistance of the coating is insufficient, so that the ink spreads in blots and no sharp recording can be obtained.

As above described this invention can obtain good recording by the combined use of (A) photo polymerizable, double bonded anionic synthetic resin, (B) partially or completely saponified polyvinyl alcohol, or partially or completely saponified polymer of vinyl acetate with other polymerizable monomer, or derivatives thereof, and/or (C) homopolymer of N-vinylpyrrolidone or copolymer of other polymerizable monomer therewith, and with respect to the case where (A) component is used alone, the present inventors formerly filed a patent application (Japanese Patent Application No. 165392/84 which is corresponding to Japanese Patent Application Laid-Open No. 43592/86), in which the recording obtained was fairly good in the points of the dryness, color running, sharpness, etc., of the ink, but in this invention these required properties could be much improved to be raised to a higher level well matching the recent progress in the hard instruments. However, in the case where (B) component and/or (C) component is used alone, no good recording can be obtained on account of the fact that when coating is formed, repelling appears on the coating, whitening of the coating occurs, or because of the insufficient water resistance the ink runs badly or formed spotty stains, and so on.

(Optional Components)

Besides the above-described (A), (B), and (C) components, in order to improve the conditions of the coating, there may be optionally added specific monomers such as higher alcohol ethoxylate, acrylate and diacrylate of polyalkylene glycol; pentaerythritol triacrylate, trimethylolpropane triacrylate; wetting agent; leveling agent (for example, silicone resin, ethoxylate and propoxylate of higher alcohol, etc.); other electrolyte polymer; and additives (for example, fillers such as clay, calcium carbonate, etc.; colloid sols such as silica sol, alumina sol, etc.).

Also, when resins are cured by ultraviolet rays selected from actinic rays, 0.5 to 5 parts by weight of photochemical reaction initiator should be incorporated on the basis of 100 parts by weight of resin. As the photochemical reaction initiator, for example, benzophenones such as benzophenone, o-benzoylbenzoic methyl, 4,4'-bisdimethylaminobenzophenone, etc., benzoinalkyl ethers such as benzoinmethyl ether, benzoinethyl ether, etc.; ketals such as acetophenone diethylketal, benzyldimethyl ketal, etc.; thioxanthones such as chlorothioxanthone, methylthioxanthone, isopropylthioxanthone, etc., dibenzyls; etc., can be utilized, and also, as the amine used in combination, triethanolamine, diethanolamine, ethanolamine, trialkylamine, dialkylamine, alkylamine, etc., can be utilized. The amount of the amines used is 0.001 to 3 parts by weight on the basis of 100 parts by weight of the polymerizable resin.

In addition to the above, phenols such as hydroquinone, t-butylhydroquinone, catechol, hydroquinone monomethyl ether, etc.; quinones such as benzoquinone, diphenylbenzoquinone, etc.; phenothiazines; copper, etc. as the thermal polymerization inhibitor may be incorporated in an amount of 0.0001 to 3 parts by weight on the basis of 100 parts by weight of the polymerizable resin.

(Recording Sheet)

The coating of the resin composition on a substrate for forming the recording layer is carried out according to air-knife coating, blade coating, bar coating, gravure coating, curtain coating, roller coating, spray coating, etc., processes on a substrate such as polyethylene terephthalate film, etc., and after the drying of the solvent the polymerizable resin is made to cross-link by the irradiation with ultraviolet rays, electron beam, etc., to form recording layer on the substrate sheet. The amount of the coating as the recording layer is in the range of 1 to 20 g/m$^2$, or preferably 2 t 10 g/m$^2$. The specific examples of the substrate sheet include plastic film, synthetic paper, paper whose sizing degree, air permeability, smoothness, etc., have been adjusted, processed paper carrying barrier coating layer provided by resin coating or extrusion coating or the like of thermoplastic resin, resin impregnated paper, metal sheet, etc. In order to enhance the adhesive property of the recording layer anchor coating is sometimes applied on these substrate sheets.

The specific examples of the actinic rays used for curing the polymerizable resins include high energy ionizing radiations and ultraviolet rays.

As the high energy ionizing radiation, for example, the electron rays accelerated by an atomic accelerator such as Cockcroft-type accelerator, van de Graaff-type accelerator, linear accelerator, betatron, cyclotron, etc., can be used most convenienty and economically, but in addition to the above the radiations such as gamma-rays, X-rays, alpha-rays, beta-rays, neutron rays, proton rays, etc., that are emitted from radioactive isotopes or atomic reactor, or the like can also be used.

The specific examples of the ultraviolet ray source include ultraviolet fluorescent lamp, low pressure mercury lamp, high pressure mercury lamp, superhigh pressure mercury lamp, xenon lamp, carbon arc lamp, sun light, etc.

In the case where as the actinic rays are used the above described high energy ionizing radiations the photochemical reaction initiator need not be particularly used, but in the case where the ultraviolet rays are used, there is needed the above described photochemical reaction initiator which can initiate the polymerization by absorbing ultraviolet rays to generate radicals.

Aqueous ink recording sheet of this invention is most adapted as the drawing films for preparing the block copy which is drawn by aqueous ink and films for X-Y plotter using an aqueous ball point pen, an aqueous felt pen, etc. Particularly, in the case where overhead projector (OHP) sheet is prepared by the use of an X-Y plotter it is the actual situation that the drawing is made by substituting an oily pen for a color aqueous pen which is used in the drawing on the ordinary plain paper, but when in use of the recording sheet of this invention an aqueous pen in the conventional use can be used as such for the drawing, thus getting rid of the troublesome task of exchanging at once.

The aqueous ink recording sheet of this invention is such that a resin composition containing as the chief ingredient a mixture comprising (A) photo polymerizable, double bonded anionic synthetic resin, and (B) partially or completely saponified polyvinyl alcohol, or partially or completely saponified polymer of vinyl acetate with other polymerizable monomer, or derivatives thereof, and/or (C) homopolymer of N-vinylpyrrolidone or copolymer of other polymerizable monomer therewith is coated on the surface of a substrate on the form of a sheet, the coated resin composition is dried and the dried resin composition is subjected to photocrosslinking. Even when merely an electrolyte polymer containing anionic group is coated on a sheet, upon putting an aqueous ink thereon, the surface tension causes the ink to diffuse and spread, so that no sharp image is obtained, but in accordance with this invention, the electrolyte polymer is of the type obtained by actinic ray crosslinking, and further resins of polyvinyl alcohol-series and/or polyvinylpyrrolidone-series are usd in combination and irradiated with actinic rays, so that the electrolyte polymer of this type can be imparted moderate hydrophobicity (water resistance), and as the result the aqueous ink can keep the shape of the ink drop with an appropriate contact angle being maintained without diffusing on the surface layer of photo cross linked resin of the sheet and can be absorbed sharply as it is without spreading.

The resin composition in this invention is also characterized in that even without anchor coating it shows excellent adhesion against polyester film which is generally said to be scarcely adhesive without anchor coating.

With reference to several examples this invention will be more fully explained below, but it should be understood that this invention is not limited thereto. In addition, all parts and percentages in these examples are by weight.

EXAMPLES OF PREPARATION OF POLYMERIZABLE DOUBLE BONDED ANIONIC SYNTHETIC RESIN

Resin I

In a flask were charged 30 parts (0.35 g equivalent) of methacrylic acid, 40 parts of methyl methacrylate, 30 parts of butyl methacrylate, 100 parts of isopropanol, and 0.5 part of 2,2'-azobisisobutyronitrile, and polymerization was carried out for 6 hours at 80° C. in an atmosphere of nitrogen.

Then, 14.9 parts (0.12 g equivalent) of glycidyl acrylate and 0.4 part of tetramethylammonium bromide were added thereto, and after 4 hours of stirring at 80° C., cooled with water. Adding dropwise 9.3 parts (0.23 g equivalent) of sodium hydroxide and 150 parts of water, the solution was stirred for one hour and further for 3 hours at 40° C., whereby Resin I was obtained. The molecular weight of this methacryl resin was about 30,000, containing the following units in the molecular chain.

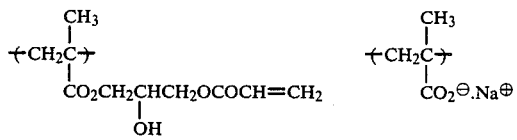

Resin II

Similarly to the case of Resin I, polymerization reaction was carried out using 70 parts (0.97 g equivalent) of acrylic acid, 10 parts of ethyl acrylate, 20 parts of lauryl methacrylate 100 parts of isopropanol, and 0.5 part of 2,2'-azobisisobutyronitrile, and modified with 63 parts (0.41 g equivalent) of glycidyl acrylate, 1.6 parts of tetramethylammonium bromide, 31 parts (0.55 g equivalent) of potassium hydroxide, and 300 parts of water to obtain Resin II. The molecular weight of this acryl resin was about 40,000 containing the following units in the molecular chain.

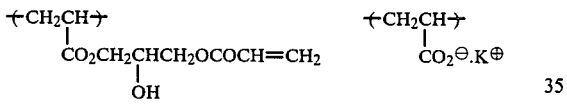

Resin III

In a flask were charged 50 parts (0.69 g equivalent) of acrylic acid, 20 parts of methyl acrylate, 30 parts of butyl acrylate, 100 parts of 1,4-dioxane, and 0.5 part of 2,2'-azobisisobutyronitrile, and polymerization reaction was carried out for 6 hours at 80° C. in an atmosphere of nitrogen.

Then, 32 parts (0.28 g equivalent) of hydroxethyl acrylate, and 1.0 parts of p-toluenesulfonic acid were added thereto, and after 4 hours of stirring at 80° C., cooled with water. Adding dropwise 30.5 parts (0.20 g equivalent) of triethanolamine and 250 parts of water, the solution was stirred for one hour and further for 3 hours at 40° C., whereby Resin III was obtained. The molecular weight of this acryl resin was about 37,000 containing the following units in the molecular chain.

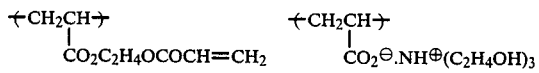

Resin IV

In a flask were charged 45 parts (0.63 g equivalent) of acrylic acid, 25 parts of methyl acrylate, 30 parts of butyl acrylate, 100 parts of isopropanol, and 0.5 part of 2,2'-azobisisobutyronitrile, and polymerization reaction was carried out for 6 hours at 80° C. in an atmosphere of nitrogen.

Then, 28 parts (0.21 g equivalent) of chloroethyl acrylate, 16.6 parts of pyridine were added thereto, and after 4 hours of stirring at 50° C., cooled with water. Adding dropwise 16.7 parts (0.42 g equivalent) of sodium hydroxide and 250 parts of water, the solution was stirred for one hour and further for 3 hours at 40° C., whereby Resin IV was obtained. The molecular weight of this acryl resin was about 34,000, containing the following units in the molecular chain.

Resin V

In a flask were charged 30 parts (0.21 g equivalent) of glycidyl methacrylate, 70 parts of butyl methacrylate, 100 parts of isopropanol, and 0.5 part of dimethylvaleronitrile, and polymerization reaction was carried out for 6 hours at 60° C. in an atmosphere of nitrogen.

Then 27.3 parts (0.42 g equivalent) of itaconic acid and 0.8 part of tetramethylammonium bromide were added thereto, and after 8 hours of stirring at 60° C., cooled with water. Adding dropwise 8.3 parts (0.21 g equivalent) of sodium hydroxide and 150 parts of water, the solution was stirred for one hour and further for 3 hours at 40° C., whereby Resin V was obtained. The molecular weight of this methacryl resin was about 20,000, containing the following unit in the molecular chain.

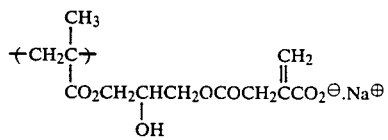

Resin VI

In a flask were charge 49 parts (1 g equivalent) of maleic anhydride, 51 parts of styrene, 150 parts of methyl ethyl ketone, and 0.5 part of 2,2'-azobisisobutyronitrile, and polymerization reaction was carried out for 6 hours at 80° C. in an atmosphere of nitrogen.

Then 38.7 parts (0.33 g equivalent) of hydroxyethyl acrylate and 1.2 parts of pyridine were added thereto, and after 4 hours of stirring at 80° C., cooled with water. Adding dropwise 37.3 parts (0.67 g equivalent) of potassium hydroxide and 250 parts of water, the solution was stirred for one hour and further for 3 hours at 40° C., and then, while adding 150 parts of water under diminished pressure at 40° C., 150 parts of methyl ethyl ketone was distilled off, whereby Resin VI was obtained. The molecular weight of this maleic anhydride resin was about 50,000 containing the following unit in the molecular chain.

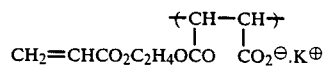

Resin VII

Similarly to the case of preparation of Resin I, using 50 parts (0.27 g equivalent) of styrenesulfonic acid, 50 parts of styrene, 150 parts of isopropanol, and 0.5 part of 2,2'-azobisisobutyronitrile, polymerization reaction was carried out, and then modified with 12.1 parts (0.09 g equivalent) of glycidyl acrylate, 0.4 part of tetramethylammonium bromide, 7.0 parts (0.18 g equivalent) of sodium hydroxide, and 100 parts of water, whereby Resin VII of molecular weight about 45,000 was obtained.

Resin VIII

Similarly to the case of preparation of Resin I, using 50 parts (0.25 g equivalent) of styrene sulfate, 50 parts of styrene, 150 parts of isopropanol, and 0.5 part of 2,2'-azobisisobutyronitrile, polymerization reaction was carried out, and then, modified with 11.8 parts (0.09 g equivalent) of glycidyl acrylate, 0.4 part of tetramethylammonium bromide, 8.8 parts (0.16 g equivalent) of potassium hydroxide, and 100 parts of water, whereby Resin VIII of molecular weight about 43,000 was obtained.

Resin IX

Similarly to the case of preparation of Resin I, using 55 parts (0.56 g equivalent) of 2-hydroxyethylacryloyl phosphate, 20 parts of methyl acrylate, 25 parts of ethyl acrylate, 150 parts of isopropanol, and 0.5 part of 2,2'-azobisisobutyronitrile, polymerization reaction was carried out, and then, modified with 28.7 parts (0.22 g equivalent) of glycidyl acrylate, 0.9 part of tetramethylammonium bromide, 13.4 parts (0.34 g equivalent) of sodium hydroxide, and 150 parts of water, whereby Resin IX of molecular weight about 35,000 was obtained.

Comparative Resin I

Similarly to the case of preparation of Resin I, using 36 parts (0.42 g equivalent) of methacrylic acid, 35 parts of methyl methacrylate, 29 parts of butyl methacrylate, 100 parts of isopropanol, and 0.5 part of 2,2'-azobisisobutyronitrile, polymerization reaction was carried out, and then, modified with 1.5 parts (0.01 g equivalent) of glycidyl acrylate, 0.05 part of tetramethylammonium bromide, 11.8 parts (0.30 g equivalent) of sodium hydroxide, and 200 parts by water, whereby Comparative Resin I of molecular weight about 32,000 was obtained.

Comparative Resin II

Similarly to the case of preparation of Resin I, using 90 parts (1.05 g equivalent) of methacrylic acid, 10 parts of butyl methacrylate, 150 parts of isopropanol, and 0.5 part of 2,2'-azobisisobutyronitrile, polymerization reaction was carried out, and then, modified with 89.3 parts (0.70 g equivalent) of glycidyl acrylate, 2.7 parts of tetramethylammonium bromide, 14 parts (0.35 g equivalent) of sodium hydroxide, and 400 parts of water, whereby Comparative Resin II of molecular weight about 70,000 was obtained.

Next, the Examples and Comparative Examples in which the above described resins were used will be explained.

EXAMPLES 1-11 AND 13-15, COMPARATIVE EXAMPLES 1-3, 5-7, 9-10 AND 12-13

A composition containing 3 parts of photochemical reaction initiator (trade name "VICURE 55" manufactured by Stauffer Chemical Co.) per 100 parts of the photo polymerizable, double bonded anionic synthetic resin described in Table 1 was diluted with water/isopropanol (1/1 weight ratio) to give a 10% solution, which was coated either on the polyester film (100 micron thick) anchor-treated (anchor-treating agent, trade name "Under Lacquer RU" supplied by Toyo Ink Co., 0.5 g/m$^2$) or the polyester film (100 micron thick) not anchor-treated by means of a bar coater so that the amount of solids coated reached 4 g/m$^2$.

Then, the coating was dried and using an ultraviolet curing apparatus (made by Nihon Denchi Co., Ltd.; 80 W/cm), cured at a conveyor rate of 10 m/min. to give transparent film for recording.

EXAMPLE 12

The 10% dilute solution of the resins described in Table 1 dissolved in water/isopropanol (1/1 weight ratio) was coated on the polyester film, which was beforehand anchor-treated, by means of a bar coater so that the amount of solids coated reached 4 g/m$^2$, and after drying, the coating was exposed to 1.0 Mrad of electron beam at an acceleration voltage of 150 KV and a beam current of 2.0 mA with the use of an electron beam irradiation apparatus (Electron Curtain manufactured by Energy Science Co., Ltd.) to give transparent film for recording.

EXAMPLE 16

A composition containing 3 parts of photo chemical reaction initiator, VICURE 55, per 100 parts of the photo polymerizable, double bonded anionic synthetic resin in Table 1 was diluted with water/isopropanol (1/1 weight ratio) to give a 10% solution, which was applied on coated paper (trade name "SK coat", manufactured by Sanyo Kokusaku Pulp, Co.) by means of a bar coater so that the amount of dry solids reached 5 g/m$^2$, and after drying, the coating was irradiated with ultraviolet rays (conveyor rate, 10 m/min.) to give recording paper.

COMPARATIVE EXAMPLES 4, 8, AND 11

The 10% dilute solution of resins in Table 1 dissolved in water/isopropanol (1/1 weight ratio) was coated on the polyester film (100 micron thick) anchor-treated so that the amount of solids coated reached 4 g/m$^2$, and dried to give transparent film for recording.

In addition to the above described Examples 1 to 16 and Comparative Examples 1 to 13, a commercially available ink jet recording paper of fine quality (Reference Example 1) and the coated paper used in Example 16 (Reference Example 2) were also taken together, and the ink jet recording properties were evaluated by the following methods.

(1) Measurement of dot density and dot diameter: Sakura densitometer PDM-5 (manufactured by Konishi Roku Shashin Kogyo Co.) was used.

(2) Observation of shape of dot: The shape of dot observed under a stereoscopic microscope was evaluated by the edge portion. The evaluation was made in three grades of ◯ (circular and sharp), Δ (comparatively circular but somewhat spreading), and X (irregular and badly spreading).

(3) Dryness of ink: Using sharp color image plotter IO-0700 a test pattern was recorded, and after one minute it was transferred onto paper, and the dryness was evaluated according to the absence or presence of transfer. The evaluation was made in five grades of from 5 (no transfer occurs at all) to 1 (transfer occurs severely).

(4) Surface resistivity: Measured under the conditions: 20° C., 60% relative humidity by the use of an insulation resistance tester TR-8601 manufactured by Takeda Riken Co.

(5) Stickiness: The surface of the coating was felt with finger. The evaluation was made in three grades of ◯ (no stickiness), Δ (somewhat sticking) and X (badly sticking).

(6) Water resistance: Water drops were dropped in a definite amount on the coating from a dropping pipet, and immediately wiped off whereby the extent of the damage to the coating was evaluated. The evaluation was made in three grades of ◯ (no damage), Δ (damaged to some extent), and X (completely wiped off).

The results are shown in Table 1.

An image was printed on each of the ink jet recording transparent sheets in Examples 1 to 15 of this invention by means of a color image printer (IO-0700, manufactured by Sharp Co.), and as compared with Comparative Examples 1 to 13 it was found that Examples of this invention were superior to them in the dryness of the ink, showed so good adhesion that even by rubbing the imaged portion never came off, and moreover, the printed image was high in the color density and sharp with high resolution, so that the ink jet recording transparent sheet of this invention was most adapted to the film for color overhead projector. On the other hand, in the case where an image was printed on the substrate material, polyester film, the ink never became dry, and because of the occurrence of repelling, the ink readily came off by fingering.

The printed image on the ink jet recording paper of Example 16 was high in the color density and sharp with high resolution, and so compared with the coated paper for general use (Reference Example 2) that was used as the substrate and the ink jet recording paper of fine quality (Reference Example 1) it was of far much superior image quality.

Drawing was made on the recording sheets of Examples 2, 5, and 8 of this invention with aqueous ink pens (black, red, yellow, blue) by the use of an X-Y plotter PL-2000 (manufactured by Yokogawa Denki Seisakujo) and as the result it was found that the image obtained in each color of the aqueous ink and the dryness of the ink were very good, showing excellent adaptability for drawing and especially for use as the film for overhead projector.

TABLE 1

| No. | Anionic syntheric resin | Polyvinyl alcohol | Polyvinyl pyrrolidone | Substrate material | Anchor treatment | UV or EB | Ink dryness | Dot shape | Dot diameter (micron) | Dot density (black) | Transparency | Stickiness | Water resistance | Surface resistivity (Ω) |
|---|---|---|---|---|---|---|---|---|---|---|---|---|---|---|
| Example | | | | | | | | | | | | | | |
| 1 | I 80 | KP08 20 | — | Polyester film | Yes | UV | 4-5 | | 180 | 1.80 | | | | $9.3 \times 10^9$ |
| 2 | I 50 | KP08 50 | — | Polyester film | Yes | UV | 5 | | 165 | 1.87 | | | | $2.1 \times 10^{10}$ |
| 3 | I 20 | KP08 80 | — | Polyester film | Yes | UV | 4-5 | | 195 | 1.75 | | | Δ | $7.0 \times 10^{11}$ |
| 4 | II 80 | — | K30 20 | Polyester film | Yes | UV | 4-5 | | 175 | 1.80 | | | | $9.2 \times 10^9$ |
| 5 | II 50 | — | K30 50 | Polyester film | Yes | UV | 5 | | 170 | 1.86 | | | | $1.3 \times 10^{10}$ |
| 6 | II 20 | — | K90 80 | Polyester film | Yes | UV | 4-5 | | 190 | 1.82 | | | | $9.8 \times 10^{10}$ |
| 7 | II 80 | GM14 10 | K15 10 | Polyester film | Yes | UV | 4-5 | | 175 | 1.79 | | | | $9.5 \times 10^9$ |
| 8 | II 40 | GM14 30 | K15 30 | Polyester film | Yes | UV | 5 | | 173 | 1.88 | | | | $3.7 \times 10^{10}$ |
| 9 | II 20 | Cinnamic ester of GM14 40 | K15 40 | Polyester film | Yes | UV | 4-5 | | 195 | 1.77 | | | Δ | $8.6 \times 10^{11}$ |
| 10 | III 50 | — | K90 50 | Polyester film | No | UV | 5 | | 177 | 1.83 | | | | $1.2 \times 10^{10}$ |
| 11 | IV 50 | NH20 50 | — | Polyester film | No | UV | 5 | | 180 | 1.85 | | | | $1.1 \times 10^{10}$ |
| 12 | V 40 | KL05 30 | K60 30 | Polyester film | No | EB | 5 | | 171 | 1.87 | | | | $4.6 \times 10^{10}$ |
| 13 | VI 45 | KH20 55 | — | Polyester film | Yes | UV | 5 | | 175 | 1.83 | | | | $3.2 \times 10^{10}$ |
| 14 | VII 55 | — | K90 45 | Polyester film | Yes | UV | 5 | | 180 | 1.82 | | | | $1.0 \times 10^{10}$ |
| 15 | VIII 35 | KH20 35 | K60 30 | Polyester film | Yes | UV | 5 | | 176 | 1.83 | | | | $4.5 \times 10^{10}$ |
| 16 | IX 30 | KP08 35 | K60 35 | Coated paper | — | UV | 5 | | 179 | 1.80 | | | | $7.2 \times 10^{10}$ |
| Comparative Example | | | | | | | | | | | | | | |
| 1 | I 100 | — | — | Polyester film | No | UV | 4 | | 175 | 1.82 | | | | $4.5 \times 10^9$ |
| 2 | I 95 | KP08 5 | — | Polyester film | Yes | UV | 4 | | 180 | 1.80 | | | | $5.0 \times 10^9$ |
| 3 | I 5 | KP08 95 | — | Polyester film | Yes | UV | 3-4 | Δ-X | 250 | 1.72 | | | Δ-X | $2.0 \times 10^{12}$ |
| 4 | — | KP08 100 | — | Polyester film | Yes | — | 3-4 | Δ-X | 265 | 1.71 | | | X | $9.2 \times 10^{13}$ |
| 5 | II 100 | — | — | Polyester film | No | UV | 4 | | 165 | 1.80 | | | | $3.2 \times 10^9$ |
| 6 | II 95 | — | K15 5 | Polyester film | Yes | UV | 4 | | 170 | 1.78 | | | | $7.2 \times 10^9$ |
| 7 | II 5 | — | K90 95 | Polyester film | Yes | UV | 2-3 | Δ-X | 280 | 1.72 | | Δ | X | $1.6 \times 10^{12}$ |
| 8 | — | — | K90 100 | Polyester film | Yes | — | 1 | X | 295 | 1.71 | | Δ | X | $8.6 \times 10^{13}$ |
| 9 | — | KL05 2.5 | K15 2.5 | Polyester film | No | UV | 4 | | 175 | 1.79 | | | | $7.1 \times 10^9$ |
| 10 | II 5 | KL05 47.5 | K90 47.5 | Polyester film | Yes | UV | 2-3 | Δ-X | 260 | 1.70 | | -Δ | X | $1.3 \times 10^{12}$ |
| 11 | — | NH20 50 | K90 50 | Polyester film | Yes | UV | 2-3 | Δ-X | 285 | 1.65 | Δ | -Δ | X | $9.0 \times 10^{13}$ |
| 12 | — | GM14 50 | — | Polyester film | Yes | UV | 2-3 | Δ | 300 | 1.40 | X | | X | $1.4 \times 10^9$ |
| 13 | Comparative Resin I 50 | — | K90 50 | Polyester film | Yes | UV | 2-3 | Δ | 280 | 1.65 | | | | $6.1 \times 10^{10}$ |
| Reference Example 1 (fine paper) | Comparative Resin II 50 | — | — | — | — | — | 5 | X | 310 | 1.10 | — | — | — | $2.7 \times 10^{12}$ |
| Reference Example 2 (coated paper) | — | — | — | — | — | — | 3 | Δ | 280 | 1.70 | — | — | — | $1.3 \times 10^{13}$ |

(Note)
Trade name of polyvinyl alcohol manufactured by Nippon Synthetic Chemical Industry, Co., Ltd.: [parenthesized numerals indicate the degree of saponification]
KP08 (71–75 mol %), GM14 (86–89 mol %), NH20 (98–100 mol %), KL05 (78–82 mol %), KH20 (78–82 mol %) Trade name of polyvinylpyrrolidone manufactured by Mitsubishi Yuka Badische Co., Ltd.: [parenthesized numerals indicate molecular weight].
Ruviskol K30 (40,000), K90 (630,000), K15 (18,000), K60 (416,000)
UV: Ultraviolet ray irradiation.
EB: Electron beam irradiation.

What is claimed is:

1. An aqueous ink recording sheet which is prepared by:
   coating on the surface of a substrate sheet a resin composition containing, as the chief ingredient, a mixture comprising (A) from 10-90 wt.% of a water-soluble, photopolymerizable, double bond containing anionic synthetic resin, and at least one member selected from the group consisting of component (B) and component (C), wherein component (B) is 90-0 wt.% of partially or completely saponified polyvinyl acetate, or a partially or completely saponified polymer resin composed of 20-100 wt.% vinyl acetate and 80-0 wt.% of another polymerizable monomer or derivative thereof, and component (C) is 90-0 wt.% of a homopolymer resin of N-vinylpyrrolidone or a copolymer resin of another polymerizable monomer therewith, with the weight ratio of (A)/[(B)+(C)] being 90/10-10/90;
   drying said coated resin composition; and
   curing said dried resin composition by irradiating said resin composition with actinic radiation, thereby forming a cured resin coating layer on the substrate.

2. The aqueous ink recording sheet as claimed in claim 1, wherein said photopolymerizable, double bond containing anionic synthetic resin as component (A) is a polymerizable resin containing a polymerizable double bond, and at least one anionic group selected from the group consisting of carboxyl groups, sulfonic acid groups, sulfate group, and phosphate group, and the functional group of the neutral salt thereof.

3. The aqueous ink recording sheet as claimed in claim 2, wherein said photopolymerizable, double bond containing anionic synthetic resin as component (A) is a resin obtained by allowing a polymer resin composed of 10 to 100 wt% of a carboxyl group-containing polymerizable monomer and 90 to 0 wt% of a hydrophobic polymerizable monomer to react with an epoxy group-containing polymerizable monomer so that 0.03 to 0.60 g equivalent of the carboxyl group-containing polymerizable monomer in said polymer resin may enter into the reaction and esterify a portion of the carboxyl groups in said polymer resin, and then partially or completely neutralizing the remaining carboxyl groups with a base.

4. The aqueous ink recording sheet as claimed in claim 3, wherein said photopolymerizable, double bond containing anionic synthetic resin as component (A) is a resin containing both the following units in the molecular chain:

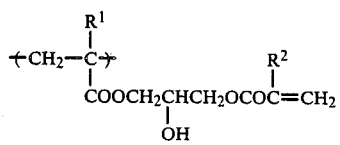

-continued

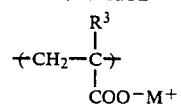

wherein $R^1$, $R^2$, and $R^3$ each represent H or $CH_3$, and M represents Li, Na, K, $NH_4$ or an amine residue.

5. The aqueous ink recording sheet as claimed in claim 2, wherein said photopolymerizable, double bond containing anionic synthetic resin as component (A) is a resin obtained by first allowing the polybasic acid groups of a polybasic acid group-containing resin and the hydroxyl groups of a hydroxyl group-containing polymerizable monomer to react to form a vinyl group- and carboxyl group-containing resin, and then partially or completely neutralizing the remaining carboxyl groups in said resin with a base.

6. The aqueous ink recording sheet as claimed in claim 5, wherein said photopolymerizable, double bond containing anionic synthetic resin as component (A) is a resin containing the following unit in its molecular chain:

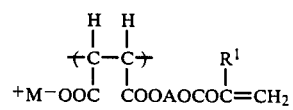

wherein $R^1$ represents H or $CH_3$, M represents Li, Na, K, $NH_4$ or an amine residue, and A represents an alkylene group having from 2 to 6 carbon atoms.

7. The aqueous ink recording sheet as claimed in claim 2, wherein said photopolymerizable, double bond containing anionic synthetic resin as component (A) is a resin obtained by allowing a polymer resin composed of 10 to 100 wt% of a carboxyl group-containing polymerized monomer and 90 to 0 wt% of a hydrophobic polymerizable monomer to react with a hydroxyl group-containing polymerizable monomer so that 0.03 to 0.60 g equivalents of the carboxyl group-containing polymerizable monomer in said polymer resin may enter into the reaction and esterify a portion of the carboxyl groups in said polymer resin, and then partially or completely neutralizing the remaining carboxyl groups with a base.

8. The aqueous ink recording sheet as claimed in claim 2, wherein said photopolymerizable, double bond containing anionic synthetic resin as component (A) is a resin obtained by allowing a polymer resin composed of 10 to 100 wt% of carboxyl group-containing polymerizable monomer and 90 to 0 wt% of a hydrophobic polymerizable monomer to react with a halogenated polymerizable monomer so that 0.03 to 0.60 g equivalent of the carboxyl group-containing polymerizable monomer in said polymer may enter into a dehydrohalogenation reaction and esterify a portion of the carboxyl groups in said polymer resin, and then partially or completely neutralizing the remaining carboxyl groups with a base.

9. The aqueous ink recording sheet as claimed in claim 7 or 8, wherein said photopolymerizable, double bond containing anionic synthetic resin as component (A) is a resin containing both the following units in the molecular chain:

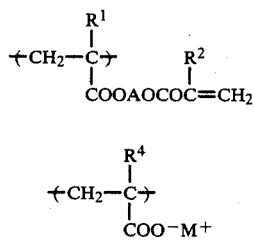

wherein $R^1$, $R^2$, and $R^3$ each represent H or $CH_3$, M represents Li, Na, K, $NH_4$ or an amine residue, and A represents an alkylene group having from 2 to 6 carbon atoms.

10. The aqueous ink recording sheet as claimed in claim 2, wherein said photopolymerizable, double bond containing anionic synthetic resin as component (A) is a resin obtained by allowing an epoxy compound and an unsaturated polybasic acid to react thereby forming a resin containing carboxyl groups and polymerizable double bonds, and then, partially or completely neutralizing the carboxyl groups in said resin with a base.

11. The aqueous ink recording sheet as claimed in claim 1, wherein said aqueous ink recording sheet is an ink jet recording sheet.

12. The aqueous ink recording sheet is claimed in claim 1, wherein said aqueous ink recording sheet is an X-Y plotter recording sheet.

13. The aqueous ink recording sheet as claimed in claim 3, wherein said base is selected from the group consisting of lithium hydroxide, sodium hydroxide, potassium hydroxide, ammonia, ethylamine, diethylamine, triethylamine, and triethanolamine.

14. The aqueous ink recording sheet as claimed in claim 5, wherein said base is selected from the group consisting of lithium hydroxide, sodium hydroxide, potassium hydroxide, ammonia, ethylamine, diethylamine, triethylamine, and triethanolamine.

15. The aqueous ink recording sheet as claimed in claim 7, wherein said base is selected from the group consisting of lithium hydroxide, sodium hydroxide, potassium hydroxide, ammonia, ethylamine, diethylamine, triethylamine, and triethanolamine.

16. The aqueous ink recording sheet as claimed in claim 8, wherein said base is selected from the group consisting of lithium hydroxide, sodium hydroxide, potassium hydroxide, ammonia, ethylamine, diethylamine, triethylamine, and triethanolamine.

17. The aqueous ink recording sheet as claimed in claim 10, wherein said base is selected from the group consisting of lithium hydroxide, sodium hydroxide, potassium hydroxide, ammonia, ethylamine, diethylamine, triethylamine, and triethanolamine.

* * * * *